July 3, 1951  D. V. JAMES  2,559,251
SPRING SUPPORT MECHANISM
Filed June 23, 1950  2 Sheets-Sheet 2
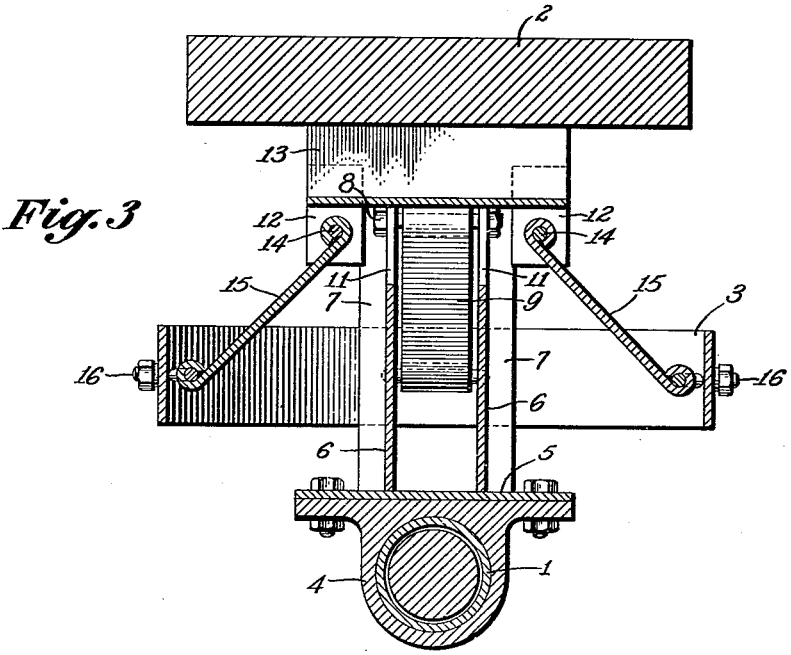
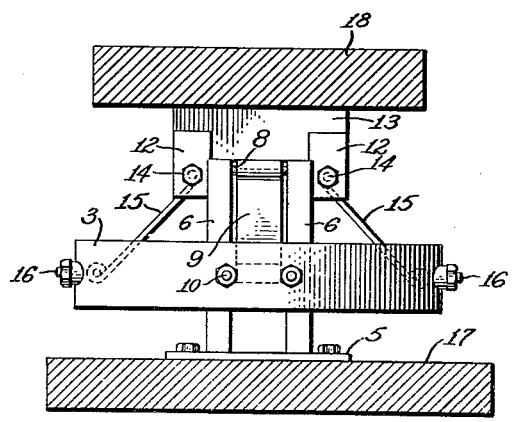
INVENTOR
*Delwin V. James*
BY *Mason, Fenwick & Lawrence*
ATTORNEYS Patented July 3, 1951

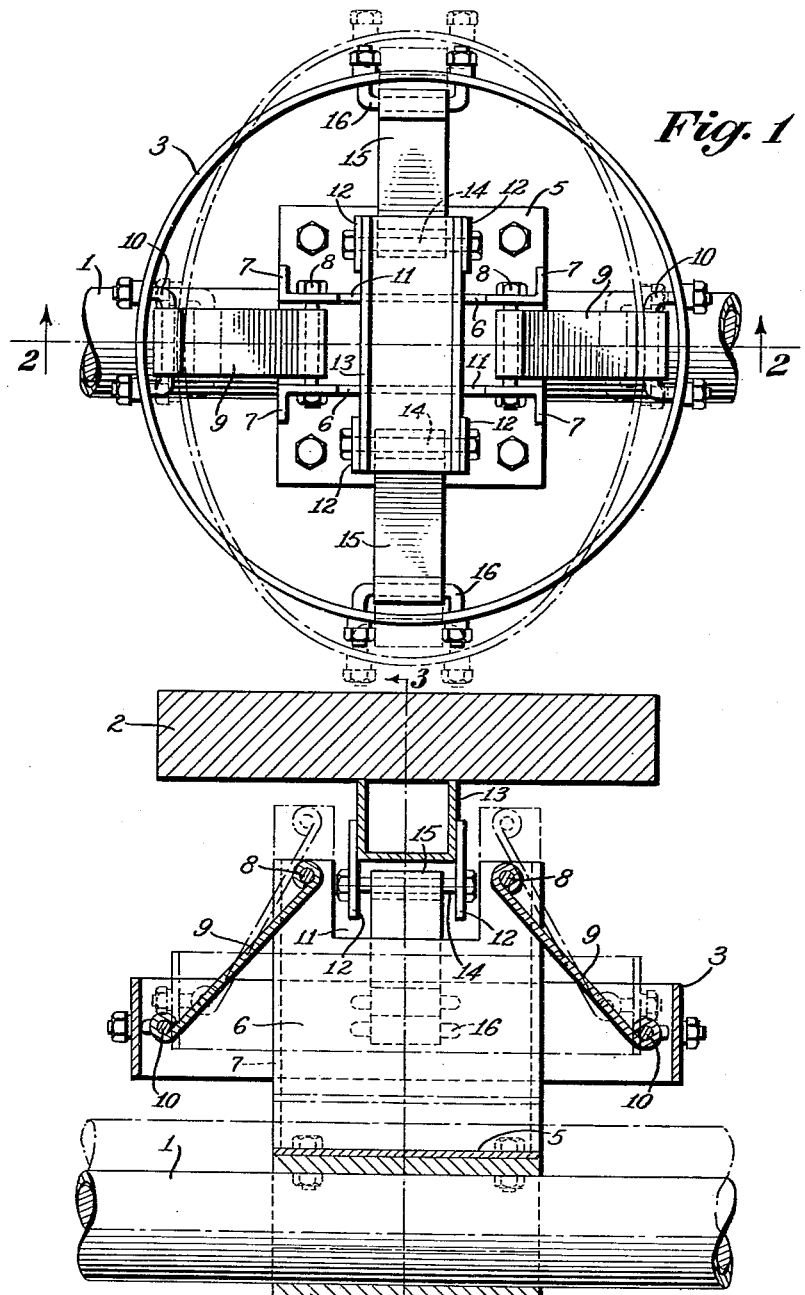

2,559,251

UNITED STATES PATENT OFFICE 2,559,251

SPRING SUPPORT MECHANISM

Delwin V. James, Houston, Tex.

Application June 23, 1950, Serial No. 169,822

5 Claims. (Cl. 267—2)

This invention relates to a spring support mechanism, designed to function primarily as a shock absorber.

The principal object of the invention is to provide a normally circular spring arranged to flex in a horizontal plane, supporting a superposed load at two opposite points of said spring, and itself supported at two other opposite points, the arrangement being such that a shock in the vertical direction emanating from the means which supports the spring, shortens the axis defined between point of support of the spring, and compensatingly lengthens the axis defined between the points of support of the load, lowering the load with respect to the spring, but compensatingly lifting the spring and with it the load, whereby the actual movement of the load toward the means which supports the spring is minimized. Thus the amplitude of movement of the load is much smaller than the amplitude of movement of the means which supports the spring, from which the shock originates.

Other objects of the invention will appear as a preferred and practical embodiment thereof proceeds.

In the drawings:

Figure 1 is a plan view partly in section, of a spring support mechanism embodying the inventive principle, the member representing the load being omitted for the sake of clarity, the full lines representing the position of parts in normal unstressed position, the broken lines indicating the position of parts when stressed by a shock;

Figure 2 is a vertical section taken along the line 2—2 of Figure 1, the member representing the load being shown;

Figure 3 is a vertical section taken along the line 3—3 of Figure 2;

Figure 4 is a vertical section through an embodiment of the invention, employing a fixed support for the spring.

Referring now in detail to Figures 1, 2 and 3, the numeral 1 represents a support which in this instance is the axle housing or unsprung part of an auto vehicle, 2 being the load or body of the automobile. Between the two is the circular leaf spring 3 lying in a horizontal plane.

A fitting 4 surrounds the axle housing, having a flat upper surface to which is bolted the base 5 of a standard, consisting of spaced vertical parallel plates 6 welded to the base, and having end flanges 7 for reinforcement. Shackle bolts 8 extend through the plates 6 in bridging relation thereto, from which the shackles 9 are swingably mounted. The shackles 9 diverge downwardly in opposite directions and at their lower ends are hingedly engaged with the horizontal midportions of U-bolts 10, which are secured to the spring 3 at diametrically opposite points. The spring is in this manner supported from the axle housing.

The plates 6 have cutaway indents 11 to make room for the transverse bolster 13, having lugs 12 depending from its ends at opposite sides, being welded thereto. The bolster is secured to the body 2. The lugs 12 are bridged by the shackle bolts 14, which suspends the shackles 15, the lower ends of said shackles being hingedly connected to U-bolts 16, secured to the spring 3 at opposite points along an axis perpendicular to the axis which extends between the U-bolts 10.

The object of the spring suspension in an auto vehicle is to minimize the vertical oscillations of the body or chassis relative to the vertical amplitude of movement of the unsprung part of the auto vehicle due to shocks, such for example as those produced by riding over a rock. This is often referred to as a "flat" or "level" ride, in which the body or chassis deviates as little as possible from its absolute level in space.

The present invention comes close to realizing this ideal. Referring particularly to Figures 2 and 3, the axle housing 1 moves up due to the wheel of the vehicle riding over a stone. This moves the standard upwardly, raising the shackle bolts 8. Since the spring 3 has considerable inertia due to its supporting the body 2, it does not rise freely with the shackle bolts 8, but resists rising, so that it is pulled in on both sides by the shackles 9, which as the bolts 8 rise, assume the broken line position of Figure 2. Shortening of the axis between the lower ends of shackles 9 lengthens the axis of the spring between the lower ends of the shackles 15, which causes said last named shackles to spread, lowering the shackle bolts 14 and bringing the body 2 down closer to the level of the spring.

However, this tendency of the body to come down with respect to its absolute level is nullified, or for the most part offset by the simultaneous rise of the spring 3 itself. The pulling force of the shackles 9 as the shackle bolts 10 rise is resolved into two components, one acting horizontally inward, shortening the axis of the spring between the shackles 9 as we have seen. The other component acts vertically upward, raising the spring 3 bodily to its broken line position in Figure 2, and correspondingly raising the body 2 which is supported upon said spring. The body, therefore, remains substantially at its same absolute level, notwithstanding the rise of the axle from the full to broken line positions shown in Figure 2. The amount that the spring has to distort to keep the body at or close to absolute level is less than in any spring mounted in a vertical plane, for the latter type of spring is incapable of moving up bodily toward and with the load to offset the tendency of the load to descend with the distortion of the spring.

Figure 4 represents an embodiment of the invention in which the support for the spring is fixed, said support being the floor 17, to which the base 5 of the standard is bolted. The load 18 may be part of a machine. The purpose of the invention in this form is to protect the floor from the vibrations of the machine.

The spring 3 is suspended by the downwardly divergent shackles 9 from the bolts 8, which are supported by the plates 6, and the load 18 is carried by the bolster 13 having the lugs 12 through which the bolts 14 pass, the latter being engaged by the downwardly divergent shackles 15 which are connected to the spring 3.

When the load 18 vibrates downwardly, the bolts 14 move down, thrusting the lower ends of the shackles 15 outwardly against the spring 3, lengthening its axis between said shackles and correspondingly shortening the axis between the shackles 9. This shortening causes the shackles 9 to swing down, depressing the entire spring. Since the spring moves down, the upward thrust of the upper ends of the shackles 9 against the standard is reduced compared with what the upward thrust would be if the spring 3 were stationary and the upward thrust were a component solely of the distortion of the spring.

While I have in the above description disclosed what I believe to be practical embodiments of the invention, it will be understood by those skilled in the art that the specific details of construction and arrangement of parts, as shown, are by way of example and not to be construed as limiting the scope of the invention.

What I claim as my invention is:

1. Spring suspension unit comprising a normally circular spring, a support therefor and a body constituting the load, a pair of shackles connected to said support and to said spring at diametrically opposite points on said spring for suspending said spring, and a pair of shackles connected to said body and to said spring at diametrically opposite points of said spring displaced 90° with respect to said first mentioned points, for supporting said load upon said spring, said shackles being inclined whereby to resolve shock force transmitted through them to said spring into components, one thrusting against said spring to distort it, the other moving said spring bodily in the direction of its perpendicular axis.

2. Spring suspension unit comprising a normally circular spring, a support therefor and a body constituting the load, a pair of shackles connected to said support and to said spring at diametrically opposite points on said spring for suspending said spring, and a pair of shackles connected to said body and to said spring at diametrically opposite points of said spring angularly displaced with respect to said first mentioned points for supporting said load upon said spring, said shackles of each pair being divergent in the same direction toward said spring whereby force applied to said unit in the direction of the axis of said spring spreads one pair of shackles, lengthening the axis of said spring between them and correspondingly shortens the axis between the other pair of shackles, thereby shifting the spring and with it said body in the direction of the axis of said spring.

3. Spring suspension unit comprising a normally circular spring, a support therefor and a body constituting the load, a pair of shackles connected to said support and to said spring at diametrically opposite points on said spring for suspending said spring, and a pair of shackles connected to said body and to said spring at diametrically opposite points of said spring angularly displaced with respect to said first mentioned points for supporting said load upon said spring, said shackles of each pair being divergent in the same direction toward said spring whereby force applied to said unit in either direction parallel to the axis of said spring spreads one pair of shackles lengthening the axis of said spring between them, and correspondingly shortens the axis between the other pair of shackles, thereby shifting the spring and with it said body axially in the direction of applied force.

4. Spring suspension unit comprising a normally circular spring, a support therefor extending through the diametrical plane of said spring and embracing the axis of said spring perpendicular thereto, a body constituting the load, on the same side of the diametrical plane of said spring as the extending end of said support, pairs of shackles, 180° displaced, connected respectively to said support and to said body, on the same side of the diametrical plane of said spring, the shackles of each pair being divergent toward said spring and connected thereto.

5. Spring suspension unit comprising a normally circular spring, a fixed support having a portion extending through the diametrical plane of said spring and embracing the axis of said spring perpendicular thereto, a body constituting the load, on the same side of said diametrical plane as the extending portion of said support, pairs of shackles, 180° displaced, connected respectively to said support and to said body on the same side of said diametrical plane, the shackles of each pair being divergent toward said spring whereby under movement of said load axially of said spring the load supporting shackles spread, lengthening the axis of said spring between them, and shortening the axis of the spring between the spring suspending shackles, the latter deformation causing lowering of the spring suspending shackles, thereby bodily lowering said spring and the load supported thereby.

DELWIN V. JAMES.

REFERENCES CITED

The following references are of record in the file of this patent:

UNITED STATES PATENTS

| Number | Name | Date |
| --- | --- | --- |
| 104,135 | Foster | June 14, 1870 |
| 402,168 | La Mothe | Apr. 30, 1889 |